(12) United States Patent
Bennett et al.

(10) Patent No.: US 10,379,223 B2
(45) Date of Patent: Aug. 13, 2019

(54) FOURIER ANALYSIS BY SPECTRAL TRANSFORMATION (FAST) PHOTONIC DOPPLER VELOCIMETRY (PDV) WITH SIGNAL FADE MITIGATION

(71) Applicant: Lawrence Livermore National Security, LLC, Livermore, CA (US)

(72) Inventors: Corey V Bennett, Livermore, CA (US); Natalie B Kostinski, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 470 days.

(21) Appl. No.: 15/299,402

(22) Filed: Oct. 20, 2016

(65) Prior Publication Data

US 2018/0113215 A1    Apr. 26, 2018

(51) Int. Cl.
  *G01S 17/58* (2006.01)
  *G01S 7/486* (2006.01)
  *G01S 17/32* (2006.01)
  *G01S 17/88* (2006.01)

(52) U.S. Cl.
  CPC ............ *G01S 17/58* (2013.01); *G01S 7/4865* (2013.01); *G01S 17/32* (2013.01); *G01S 17/88* (2013.01)

(58) Field of Classification Search
  CPC .......... G01S 17/58; G01S 17/88; G01S 17/32; G01S 7/4865
  USPC ....................................................... 356/28
  See application file for complete search history.

(56) References Cited

U.S. PATENT DOCUMENTS 7,738,111 B2   6/2010 Bennett
8,064,065 B2   11/2011 Bennett

OTHER PUBLICATIONS

Agha et al., "Four-Wave-Mixing Parametric Oscillations in Dispersion-Compensated High-Q Silica Microspheres," Phys. Rev. A, 76, 2007, pp. 043837-1-043837-4.
Bennett et al., "640 GHz Real-Time Recording Using Temporal Imaging," Conf. on Lasers and Electro-Optics (CLEO 2008), 4 pps.
Bennett et al., "Aberrtions in Temporal Imaging," IEEE J. of Quantum Electron., vol. 37, No. 1, 2001, pp. 20-32.
Bennett et al., "Guided-Wave Temporal Imaging Based Ultrafast Recorders," Optical Society of America, UCRL-Conf-226453, CLEO Paper CFF1, 2007, 4 pps.
Bennett et al., "Principles of Parametric Temporal Imaging—Part I: System Configurations," IEEE J. of Quantum Electron., vol. 36, No. 4, 2000, pp. 430-437.
Bennett et al., "Principles of Parametric Temporal Imaging—Part II: System Performance," IEEE J. of Quantum Electron., vol. 36, No. 6, 2000, pp. 649-655.
Bennett et al., "Temporal Magnification and Reversal of 100 Gb/s Optical Data with an Up-Conversion Time Microscope," Appl. Phys. Lett., 65 (20), 1994, pp. 2513-2515.

(Continued)

*Primary Examiner* — Daniel L Murphy
(74) *Attorney, Agent, or Firm* — John P. Wooldridge

(57) ABSTRACT

A state-of-the-art class of photonic Doppler velocimetry (PDV) diagnostic and novel methods to stabilize any class of PDV signal has been developed. The former brings velocimetry to new extremes in maximum velocity and fast time resolution, while maintaining precision velocity resolution, long record length capability, and the ability to record multiple velocities simultaneously. The latter compensates for large changes in signal intensity common in many experiments.

43 Claims, 6 Drawing Sheets

(56) References Cited

OTHER PUBLICATIONS

Bennett et al., "Time Lens Based Single-Shot Ultrafast Waveform Recording: From High Repetition Rate to High Dynamic Range," LLNL-Conf-491317, 2011, 4 pps.
Bennett, "Ultrafast Time Scale Transformation and Recording Utilizing Parametric Temporal Imaging," URL Conf. 229500, 2007, 4 pps.
Bennett et al., "Upconversion Time Microscope Demonstrating 103X Magnification of Femtosecond Waveforms," Optics Lett., vol. 24, No. 11, 1999, pp. 783-785.
Broaddus et al., "Temporal-Imaging System with Simple External-Clock Triggering," Optical Society of America, 2009, 7 pps.
Dolan, "Accuracy and Precision in Photonic Doppler Velocimetry," Rev. of Sci. Instrum., 81, 2010, pp. 053905-1-053905-7.
Dolan et al., "Note: Frequency-Conversion Photonic Doppler Velocimetry with an Inverted Circular," Rev. of Sci. Instrum., 83, 2012, pp. 026109-1-083108-3.
Foster et al., "Broad-Band Continuous-Wave Parametric Wavelength Conversion in Silicon Nanowaveguides," Optical Society of America, Opt. Express, vol. 15, No. 20, 2007, pp. 12949-12958.
Foster et al., "Silicon-Chip-Based Ultrafast Optical Oscilloscope," Nature Letters, vol. 456, 2008, 5 pps.
Foster et al., "Ultrafast Measurements Using a Silicon-Chip-Based Temporal Lens," OPN Optics & Photonics News, 2009, 1 pp.
Hernandez et al., "104 MHz Rate Single-Shot Recording with Subpicosecond Resolution Using Temporal Imaging," Optics Express, vol. 21, No. 1, 2013, pp. 196-203.
Hernandez et al., "745 fs Resolution Single-Shot Recording at 2.1 Tsample/s and 104 Mframes/s Using Temporal Imaging," OSA Nonlinear Optics Conference, Nuclear Optics, LLNL-Conf-413980, 2009, 5 pps.
Kolner, "The Pinhole Time Camera," J. Opt. Soc. Am. A., vol. 14, No. 12, 1997, pp. 3349-3357.
Kolner, "Space-Time Duality and the Theory of Temporal Imaging," IEEE J. of Quantum Electron., vol. 30, No. 8, 1994, pp. 1951-1963.
Kolner et al., "Temporal Imaging with a Time Lens," Optics Letters, vol. 14, No. 12, 1989, pp. 630-632.
Kuzucu et al., "Spectral Phase Conjugation Via Temporal Imaging," Optics Express, vol. 17, No. 22, 2009, pp. 20605-20614.
Londero et al., "Ultralow-Power Four-Wave Mixing with Rb in a Hollow-Core Photonic Band-Gap Fiber," Phys. Rev. Lett., 103, 2009, pp. 043602-1-043602-4.
Lowry et al., "Radoptic X-Ray Detection with Picosecond Resolutions," Ultra Fast Optics, LLNL-Conf-491441, 2011, 4 pps.
Salem et al., "Application of Space-Time Duality to Ultrahigh-Speed Optical Signal Processing," Adv. in Optics and Photonics., 5, 2013, pp. 274-317.
Salem et al., "Optical Time Lens Based on Four-Wave Mixing on a Silicon Chip," Optics Letters, vol. 33, No. 10, 2008, pp. 1047-1049.
Strand et al., "Compact System for High-Speed Velocimetry Using Heterodyne Techniques," Rev. of Sci. Instrum., 77 2006, pp. 083108-1-083108-8.
Vernon et al., X-Ray Bang-Time and Fusion Reaction History at Picosecond Resolution Using RadOptic Detection, Rev. Sci. Instrum., 83, 2012, pp. 10D307-1-10D307-3.
Zhang et al., "Parametric Spectro-Temporal Analyzer (PASTA) for Real-Time Optical Spectrum Observation," Scientific Reports, 3, 2064, 2013, pp. 1-5.

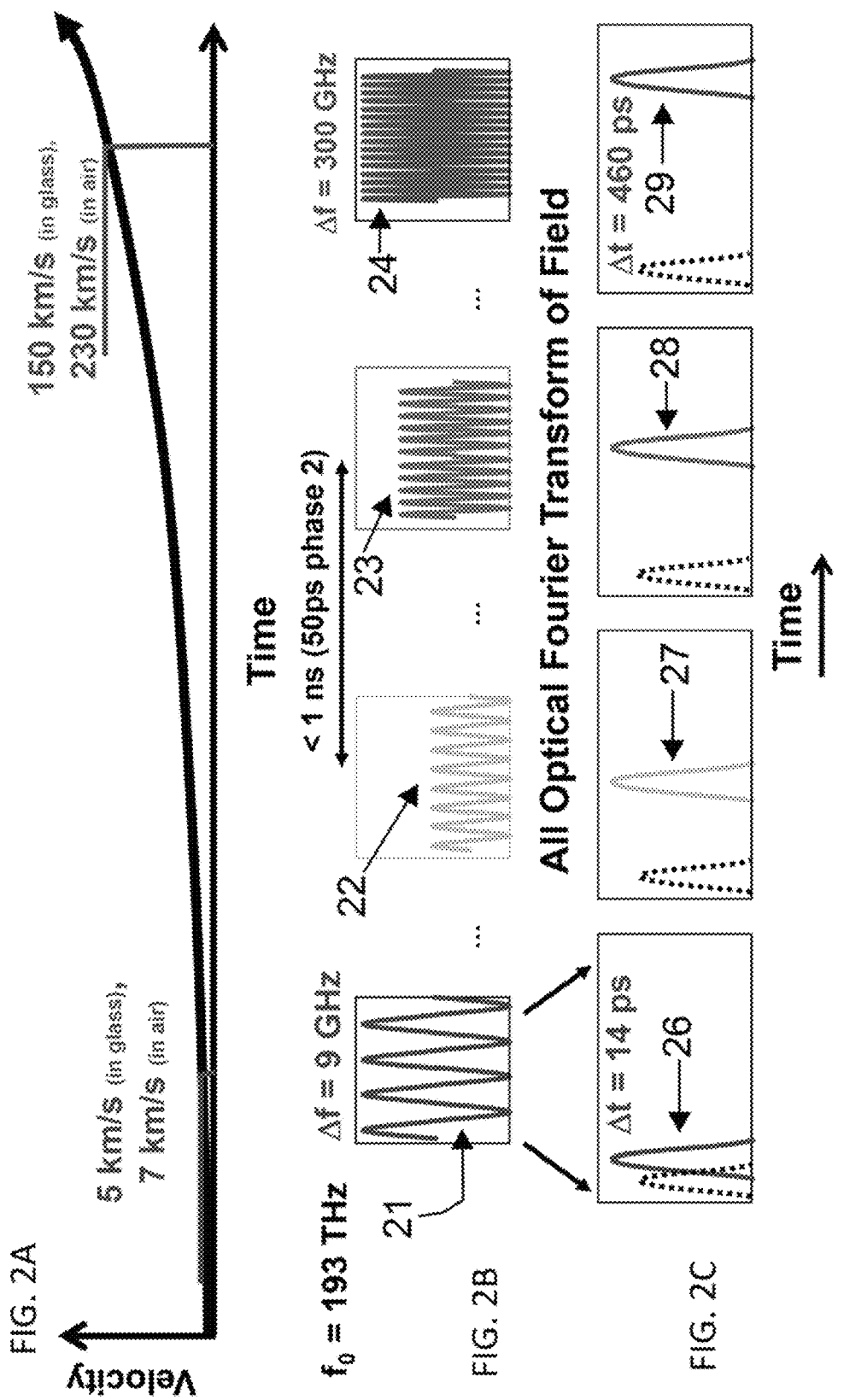

FOURIER ANALYSIS BY SPECTRAL TRANSFORMATION (FAST) PHOTONIC DOPPLER VELOCIMETRY (PDV) WITH SIGNAL FADE MITIGATION

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Field of the Invention

The present invention relates to the measurement of surface velocities, and more specifically, it relates to improvements in Photonic Doppler Velocimetry.

Description of Related Art

The conventional Photonic Doppler Velocimetry (PDV) diagnostic describes the motion of a moving surface by utilizing Doppler-shifted light. PDV is used to measure surface and shock velocities in energetic materials but is also rapidly gaining popularity in other fields, e.g., biophotonics (measuring pressure pulses in living cells for tumor destruction, pacing of the human heart). The fiber-based system typically uses 1550 nm laser light and single mode fibers to deliver light to and from the target. The Doppler shifted light is mixed with the original laser light to produce a beat frequency proportional to the velocity. The typical example is, at a velocity of 1000 m/s, the beat signal, has a frequency of 1.29 GHz. The beat signal is directly recorded onto fast digitizers, e.g., oscilloscopes. The maximum velocity is limited by the electronics bandwidth and the sampling rate of the digitizers. As an example, the measurable velocities are limited by the ~30 GHz bandwidth (equivalently~12 km/s in a homodyne/single wavelength system) of modern scopes. The total record length is limited b the memory of the digitizers. Moreover, the most frequently used analysis tool, windowed Short Time Fourier Transform (STFT) of PDV data, displayed as a spectrogram and then fit to a Gaussian/parabola to find peak frequency as a function of time, can miss local variation in velocity. It is also subject to interpretation, especially in the presence of large accelerations, noise, and multiple velocities. Typically, the homodyne implementation has temporal resolution of >1 ns since a few beat cycles are needed to uniquely determine a frequent within a STFT window. Homodyne, heterodyne, and multiplexed PDV implementations all directly record a beat signal.

Conventional PDV has some shortcomings. The STFT analysis variables include window type (e.g., Hann, Hamming), size, and overlap (e.g., 50% overlap between windows) and quoting an uncertainty given the analysis method is difficult. The accuracy and precision of PDV is limited by the signal-to-noise ratio as well. After a spectrogram is made, a parabolic/Gaussian fit is used to find peak frequency, which is then mapped to velocity. This multiple step procedure is ambiguous particularly when there are few cycles at a particular frequency, especially when the object is accelerating. Note that it is easy to entangle the window with the signal and then end up studying the window instead of the signal. It is desirable to have optical hardware complete the difficult mathematics, e.g., compute the Fourier transform with FAST velocimetry wherein, simply, a shift in time of a pulse window corresponds to a frequency, which is proportional to velocity. Also, it is often the case that a signal is lost due to changes in reflectivity of the dynamic surface, obscuring objects in the line of sight, etc. There is no way in current PDV systems to account for drop out of signal, and thus, it is desirable to provide a system having a fast dynamic gain unit and polarization control.

SUMMARY OF THE INVENTION

Fourier analysis by spectral transformation (FAST) photonic Doppler velocimetry (PDV) does not record a beat signal, but directly Fourier Transforms the Doppler-shifted signal in the optical hardware, utilizing a new regime of time lens technology, harnessing the ~THz of bandwidth of the optical systems. The Fourier transform time-lens system is one where the input dispersion, focal dispersion and output dispersion are equal. Here, measuring the optical field directly with FAST PDV gives 10,000× the optical cycles per measurement for better determination of the Doppler frequency. The FAST PDV system we describe here can measure velocities up to ~500 km/s with time step resolution of ~50 ps, but has potential for even higher velocities and finer time resolution of ~100 fs. FAST PDV could also run concurrently with conventional PDV simply by adding a fiber optic splitter on the return signal. Traditional PDV is also highly influenced by changing signal-to-noise, due to (i) bending of surfaces and changing angles of incidence, (ii) obscuring debris in the line of sight, and (iii) current lack of polarization control. Back end power stabilization systems developed at Lawrence Livermore National Laboratory (LLNL) are applicable to PDV systems such as FAST, homodyne, heterodyne, and multiplexed, Velocity Interferometer System for Any Reflector (VISAR), and Fabry Perot (FP). Two techniques that stabilize signals are described herein. The first is a fast dynamic gain method using semiconductor optical amplifiers (SOA). The second is an automatic polarization control method.

FAST PDV with signal fade mitigation measures the speed of a moving object at high speeds, subject to power fluctuations due to reflectivity changes of the surface, etc. Past techniques include conventional (standard) Photon Doppler Velocimetry (PDV) and Velocity Interferometer System for Any Reflector (VISAR), which similarly measure speeds of fast objects but are more stringently limited by the bandwidth of the digitizers. Heterodyne PDV can measure larger speeds than standard PDV, but approximate speeds must be known a priori so that the appropriate frequency shift is chosen. Standard PDV can measure up to 20 km/s, but FAST PDV can measure up to 500 km/s and measures the Doppler shifted field as opposed to a beat frequency, which is the mixing of the Doppler shifted field with the laser reference. Fundamentally, the FAST PDV system and the prior PDV systems are different.

FAST PDV can be used in shock and detonation physics experiments, or more broadly, dynamic compression research. Tests of the spallation strength of metal, phase transition kinetics, DoD ballistics, measurements of particle velocities, early time formation of jets, and the pressure output of detonators are included in this category. Thus, there are many government uses. Specifically, FAST PDV would benefit the performance evaluation of high explosive (HE) driven systems, specifically when Insensitive High Explosives (IHEs) are used. PDV is used for an indirect measurement of the explosive pressure at the interface of the HE-to-LiF window in HE-driven experiments of multiple geometries. Currently, PDV reveals an unresolved 2-3 ns wide spike in the particle velocity. This corresponds to what is known as the von Neumann spike in pressure. Unfortunately, the conventional diagnostics cannot resolve its amplitude (see Sollier et at "A novel method for the measurement of the von Neumann spike in detonating high explosives" JOURNAL OF APPLIED PHYSICS 119, 245902 (2016)). Resolving the peak pressure of the spike would validate LLNL HE (and IHE) reactive models, further constraining the energy, pressure, and volume curves that predict the measures of explosives performance. Additionally, tests involving pushing metal with explosives in order to determine explosive properties such as detonation energy, pressure, and ratio of unreacted to reacted explosives are important since they serve as calibration data points for hydrocode simulations of integrated systems.

FAST PDV could be used in geophysical applications such as interaction of high-speed projectiles with soils to determine high strain rate constitutive behavior. Also, seismic activity (1.5-8 km/s) could be measured.

FAST PDV could be used in space applications, such as space shuttle speed on reentry (16 km/s) and measuring speeds of asteroids (30 km/s) or other foreign objects. It could be physically deployed in space.

FAST PDV would also benefit material science experiments at extreme pressures and temperatures on the facilities such as the National Ignition Facility at LLNL, and other giant laser facilities in the Czech Republic, the United Kingdom, France, Russia, Hungary, Romania, Japan and China, especially those that drive multiple shocks since VISAR is limited in this regard.

The invention is useable in still other applications, including biophotonics, high speed production stress tests involving shocks and other materials shock failure tests/destructive testing.

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 2A shows a stretched version of a reflective surface or shock front velocity ramping up very quickly.

FIG. 2B shows the corresponding rapidly increasing Doppler shift of the return signal.

FIG. 2C shows a pulse time, in individual frames, when the present system Fourier transforms the Doppler shifted return signals of FIG. 2B

DETAILED DESCRIPTION OF THE INVENTION

Figures 1A, 1B:
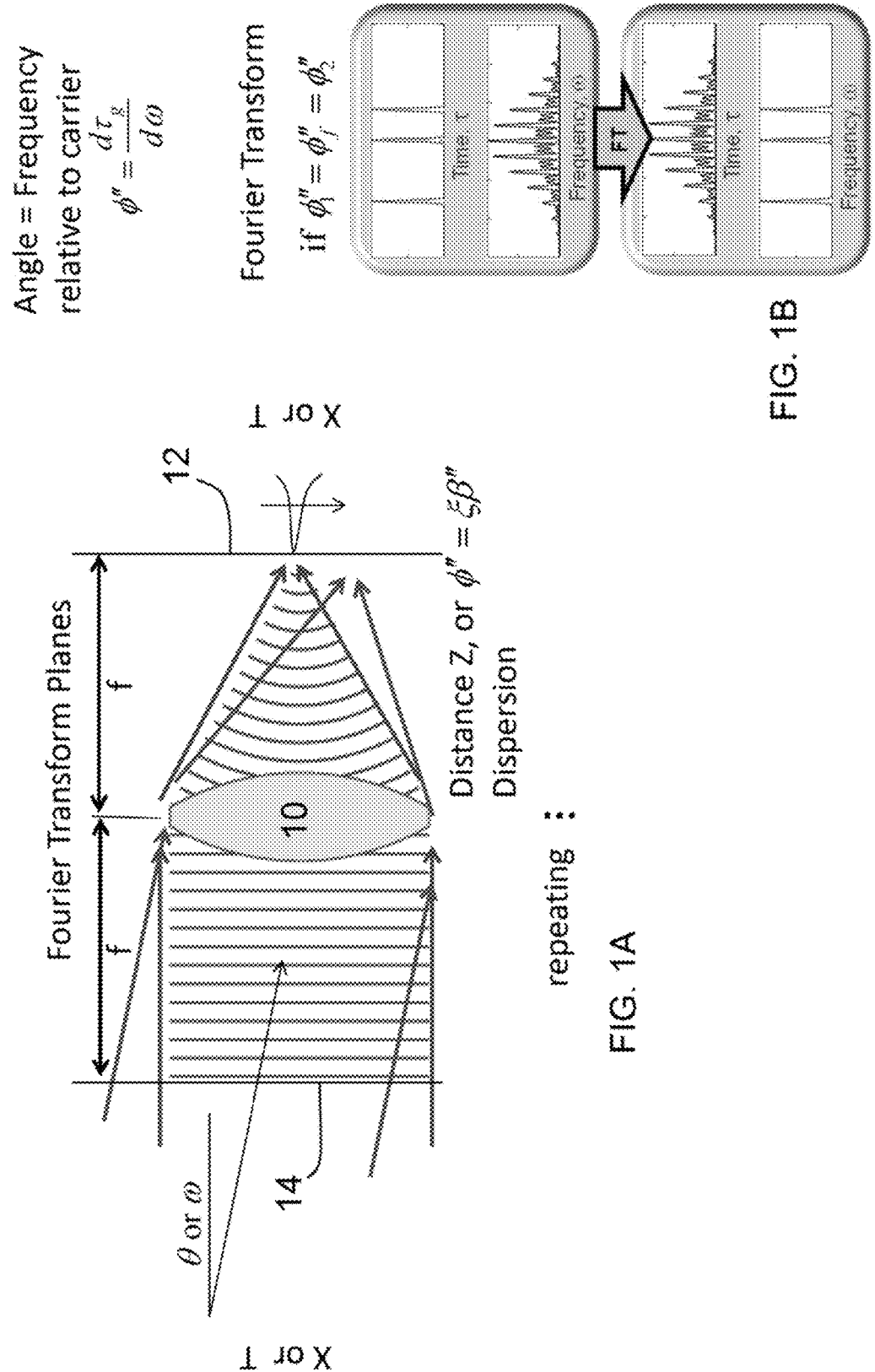
FIG. 1A illustrates a space-time analogy.
FIG. 1B shows how, in an ideal temporal Fourier Transform system, a signal at the input (shown here as 3 pulses) and its spectrum, is transformed so that at the output the spectrum looks like the input temporal signal, and vice versa.

To understand FAST PDV, basic concepts are first discussed. FIG. 1A illustrates a space-time analogy. In general, a spatial lens system, including lens 10 in this illustration, produces a Fourier transform at the back focal plane 12 of the electric field at the front focal plane 14. The output spatial profile will look like the input spatial frequency profile. In the simplifying case of plane waves at a particular angle (equivalent to a particular spatial frequency), the exact input distance becomes irrelevant due to the lack of bandwidth at the input and a beam is produced at the output that focusses to a specific location on the back focal plane (or Fourier Transform plane) 12 of lens 10. Plane waves at other angles focus to other locations because there is a one-to-one mapping of the output position and input spatial frequency (or angle). By analogy, a "time-lens" can be produced by imparting a quadratic temporal phase (equivalent to a linear frequency chirp). A temporal Fourier transforming time-lens system is created when the input dispersion, focal dispersion, and output dispersion are all equal. In the simplifying case of continuous wave light (analogous to the plane waves in space) of different frequencies, the input dispersion becomes unimportant because of the lack of input instantaneous bandwidth and a compressed pulse at different time shifts is produced at the output depending on the input frequency. For FAST PDV, the time lens pulse repeats at a high repetition rate. Mode-locked lasers in the 10 s of MHz are common. Much higher repetition rates, <1 ns period, are under development and also available. Along with high contrast ratio electro-optic or acousto-optic modulators, the rate can be easily modified substantially. Time domain multiplexing techniques with lower rate lasers and/or the use of ~10 GHz (and even ~100 GHz under development) mode-locked lasers and RF-driven optical comb sources can allow faster repetition rates. FIG. 1B shows how in an ideal system the signal is transformed so that the output spectrum looks like the input temporal signal, and the output temporal signal looks like the input spectrum.

FIG. 2A shows a stretched version of a reflective surface or shock front velocity ramping up very quickly. FIG. 2B shows the corresponding rapidly increasing Doppler shift of the return signal. The Doppler shifted optical fields 21-24 are shown in their respective time lens processed window. Shown are only a relatively low number of cycles but in reality, each window is a ~200 THz optical field with many cycles. The amplitude of the Doppler shifted signals is changed in different frames to depict the common experimental problem of changing reflection amplitude. This issue is solved in the present invention by adding an optical amplifier, discussed below, with constant output power control and/or a nonlinear optical power limiter. The system then Fourier transforms the field, producing a pulse in time (pulses 26-29), as shown in the windows of FIG. 2C. The pulse-shift in time relative to the measurement frame is proportional to the surface velocity. Representative numbers are shown.

Figure 3:
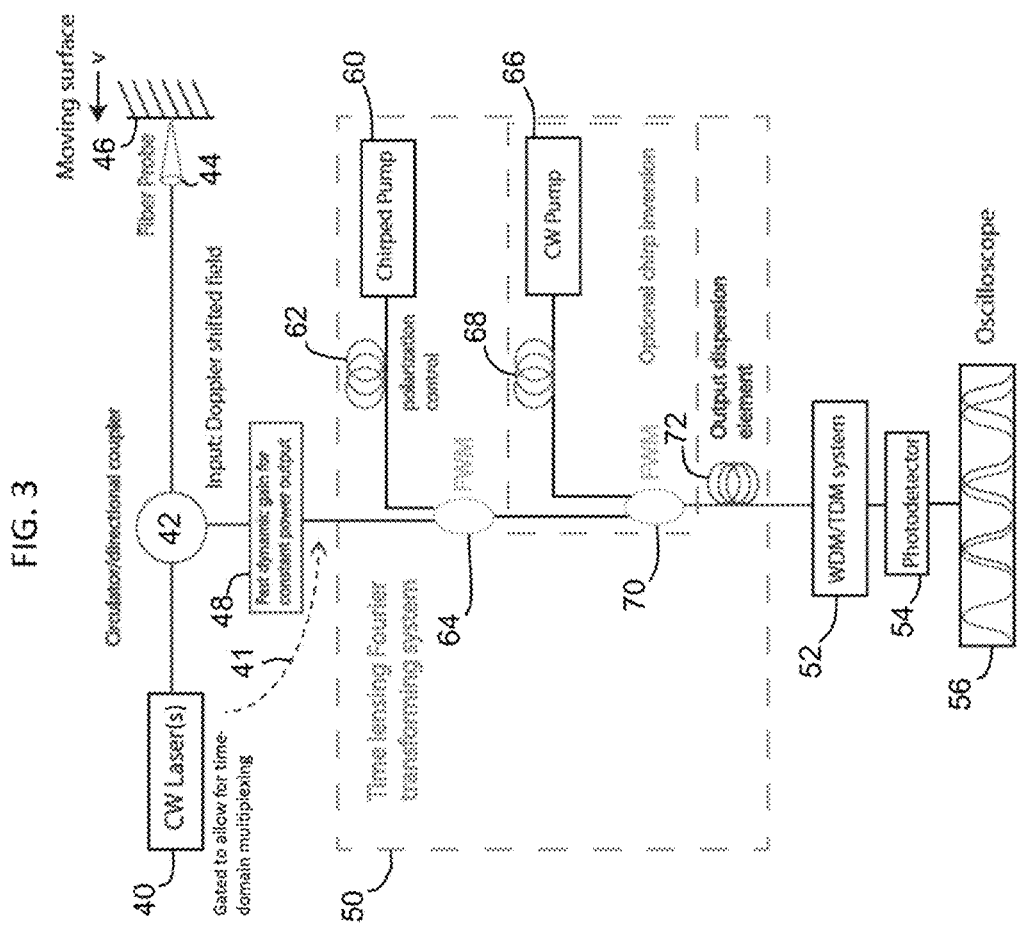
FIG. 3 shows an implementation of the overall system a setup of the present invention.

FIG. 3 shows an implementation of the overall system setup, including a portion of a standard PDV system (40, 42, 44), discussed below, a fast dynamic gain unit 48 for constant power output, a time lens-based Fourier transforming system 50, a wavelength division/time division multiplexing unit 52, and detection equipment 54, 56. For the standard PDV setup: A continuous wave (CW) laser 40 sends light through a fiber circulator 42 or fiber directional coupler to a collimating or focusing probe 44, reflecting light off a moving surface 46. The speed of the moving surface in time is of interest. After the standard PDV setup, the Doppler reflected light is then sent to a fast dynamic gain unit 48, stabilizing the signal power from changes in reflectivity due to the moving surface (e.g., tilt or dulling of surface).

This additional power stabilization unit 48, which accounts for signal fade, can take many forms. For many applications, power stabilization unit 48 must have a fast (<ns) material response and operate on a bandwidth wider than the max Doppler frequency shift. For some applications requiring ~>ns time scale power stabilization, a simple electronic feedback output power control circuit on a relatively fast response amplifier could work. For the <ns applications there are a variety of nonlinear optical devices with dynamic gain or loss used for power limiting.

The dynamic gain system should act on the reflected signal from the surface. While not used in the present invention (FAST PDV), traditional PDV uses a heterodyne or homodyne reference. In the homodyne case, the reference comes from the same source laser and is a reflection internal to the fiber probe (lens 84). A separate path (dotted line 41) is also possible and is commonly used in heterodyning systems. In either case, the dynamic gain for power stabilization needs to operate on the signal off the moving surface, which often varies in amplitude and should not need to act on the power of the reference.

At lower measurement repetition rates (<~1 measurement/ns), the use of a CW probe laser is acceptable. Concepts for operating at much higher rates included multiplexing of some variety at the output. If time domain multiplexing is involved in the output onto one scope channel, up front gating of the signal is necessary. This can be done in many places. Gating the CW lasers by either modulating their pump currents or adding modulators is a simple option and requires functions sometimes included by CW laser vendors and/or vendors of laser drivers.

The output of the dynamic gain unit 48 is then sent to the time lensing Fourier transforming system 50. The input fiber gives input dispersion. In the approximation of nearly CW light in each measurement frame (i.e., Doppler shift being significant over many measurements but small during one measurement), the amount of input dispersion is not critical and thus, an input fiber spool is not shown immediately after the dynamic gain unit 48. The figure shows dispersion implemented with optical fibers but in general it can be implemented with any dispersive system, including free space optical gratings and prism based systems, Etalons, Gires-Tournois interferometer (GTI), bulk material dispersion, and etc. Then this system is divided into 1 or 2 stages. The system shows both stages implemented via four-wave mixing (FWM)—a nonlinear effect due to a third-order optical nonlinearity, because it's believed to be optimum for this application, but in general other mixing approaches such as sum and difference-frequency mixing (and cascaded multi-stage versions) could be used depending on the optical sources and materials used. In the first stage, a chirped pulse train from chirp pump laser 60 passes through polarization control element 62 and is parametrically mixed with the Doppler shifted signal in highly nonlinear device 64 which may be an optical fiber or a nonlinear waveguide device (silicon waveguide devices are common). The chirped pump can be generated by dispersing a mode-locked laser pulse, by a rapidly frequency swept "CW" laser, by properly dispersing the pulses generated by a combination of electro-optic phase modulation and/or nonlinear pulse compression, by Fourier Domain Mode-Locked (FDML) lasers, or an other means by which a coherent rapidly chirped source may be generated. A quadratic phase shift/linear frequency shift (from the pump) is thereby imposed on the input signal. This is commonly referred to as a time lens process, with a focal dispersion equal to one over the radian frequency chirp of the pump. The optional second stage, which includes a CW pump laser 66, a polarization control element 68 and a highly non-linear device 70 (which is shown as Four-Wave Mixing) with a CW pump laser, inverts the signal spectrum complex conjugates it), allowing the use of different output dispersion element materials/systems 72. This is advantageous because different dispersive fiber types have different ratios of dispersion-to-loss and different ratios of the second order group velocity dispersion (which is desirable) to higher order dispersive aberrations (which are undesirable). Thus this optional chirp inversion can allow for the better optimization of the output dispersion element 72, shown implemented as a length of fiber.

At velocity measurement rates >~1 measurement/ns, the output frames could either overlap or become short enough that designing as system to map velocity (Doppler shift) into a time shift in a short window and have enough frame length (setting max velocity) to temporal resolution of the recorder (setting velocity resolution) could be problematic. To solve this problem and push to faster rates without requiring many more digitizer channels, we implement various multiplexing approaches (shown as a single box 52 in FIG. 3 and in more detail in FIGS. 5 and 6). The multiplexing systems shift measurement frames or spectrally selected parts of frames to later times so that they can be recorded on the same digitizer without overlapping with other measurement frames.

The optical system output is finally recorded with a fast photo-receiver 54 and oscilloscope (digitizer) 56. It is desirable that these electronic recording components are as fast as possible and have very low jitter. Since the optical system maps velocity (Doppler shift) to time, jitter in the recorder or pump laser creates measurement velocity noise. The time of the output pulse gives the velocity, thus a smaller impulse response from the electronics and fast sampling rate improves velocity resolution.

Figure 4:
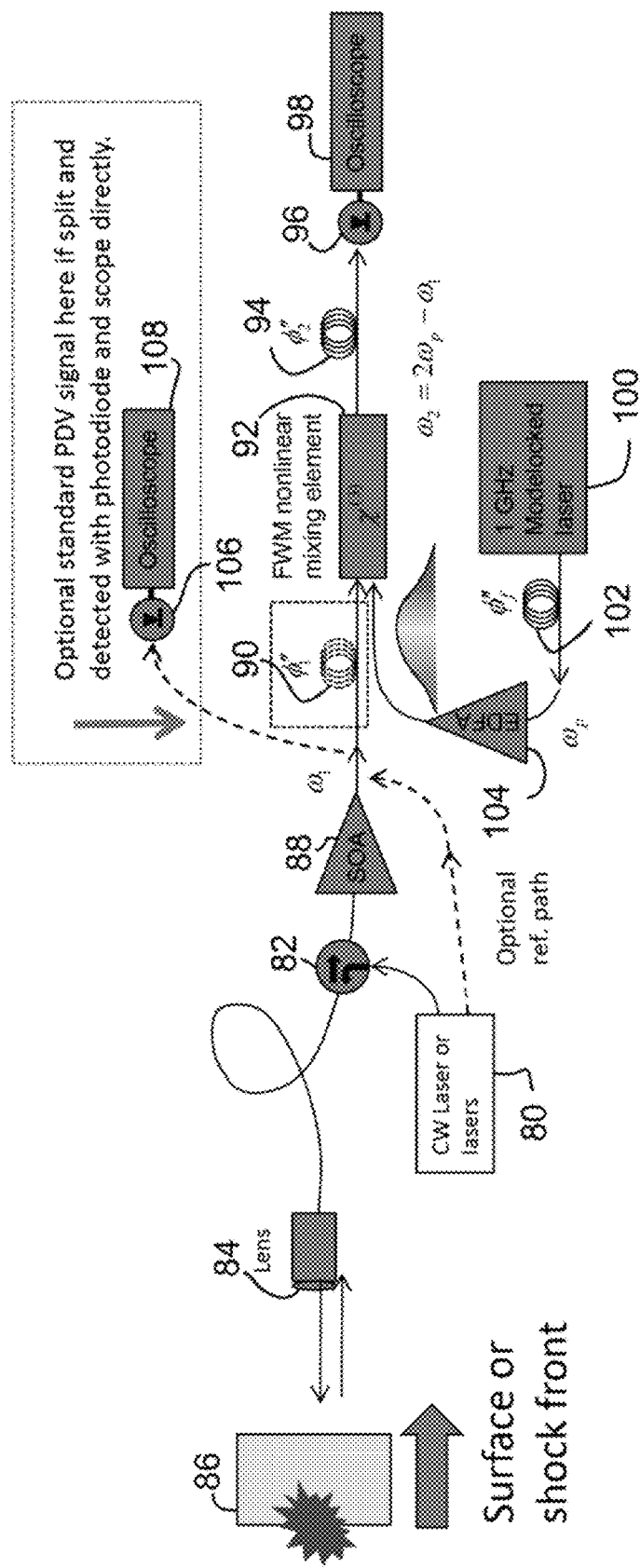
FIG. 4 is basic embodiment of the present invention without multiplexing to increase the repetition rate. A reference can be obtained from a small reflection in the incident signal path, such as off of the lens 84, or from an independent path from the laser which would have independent control of the power.

Consider the simplest system configuration of FIG. 4. Light reflecting off the moving surface experiences a Doppler shift $\delta\omega/\omega = 2\, nV/c$, where $\omega$ is $2\pi$ times the frequency of the optical wave, $\delta\omega$ is the change due to the Doppler affect, n is the index of refraction of the material (approximately=1 for air), V is the velocity of the surface and c is the speed of light in vacuum. A chirp from the pump pulse is imparted to the signal in the mixing element such that a narrow band CW laser frequency (single velocity) compresses to a narrow pulse in the output dispersion $\phi''_2$. Likewise, a change in the signal frequency (velocity) will also cause a change in the pulse time since $\phi''_2 = d\tau/d\omega$ describes both the delay change of spectral components within the pulse as well as the change in time of the overall pulse envelope due to changes in the central carrier frequency. Thus, the time change due to a velocity V is $\delta t = \phi''_2 * \omega 2\, nV/c$ or inverting this formula a velocity is determined from the change in time $V = (c\delta t)/(\phi''_2 * \omega 2n)$.

Figure 5:
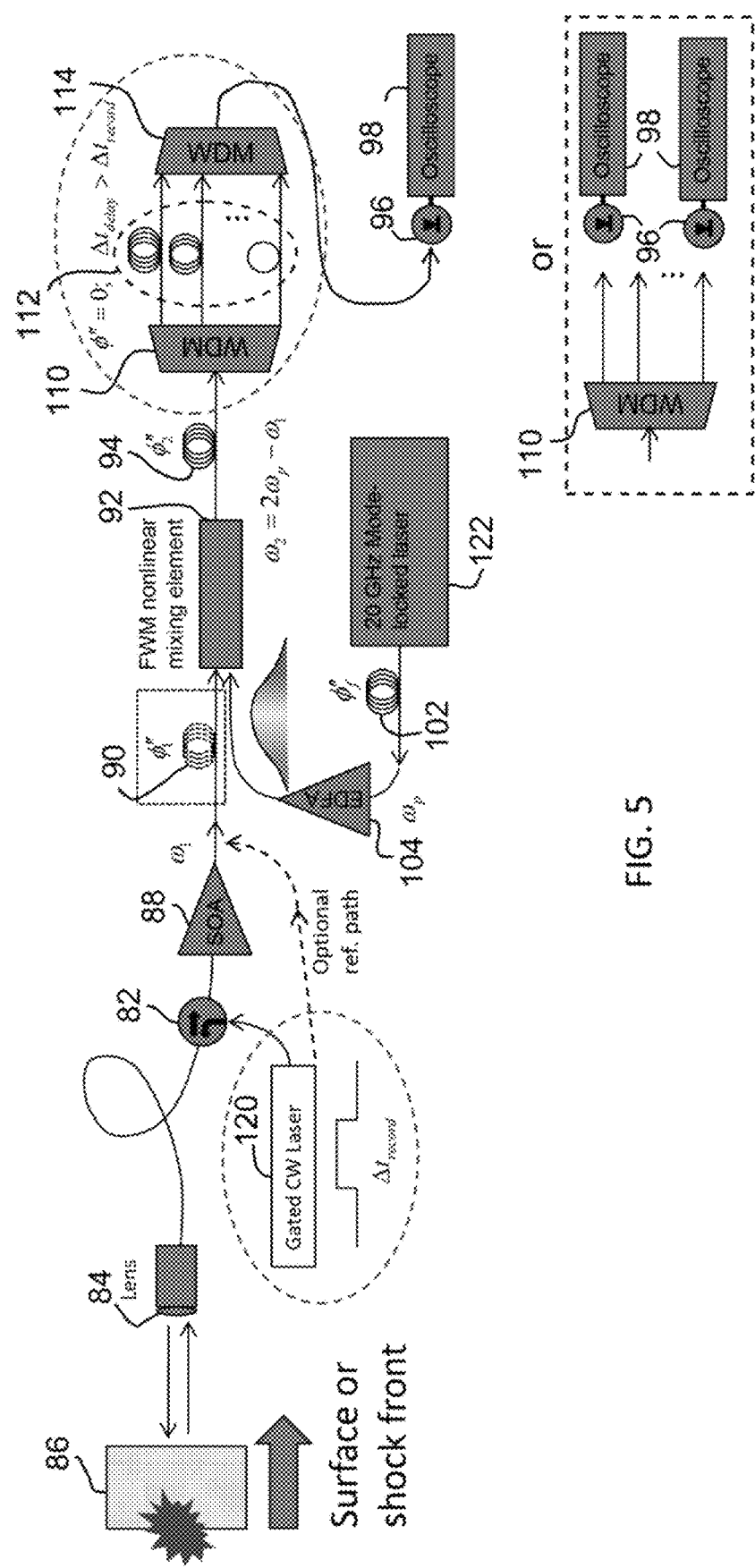
FIG. 5 shows an embodiment that uses a 20 GHz mode-locked laser and employs wavelength multiplexing to alloy higher repetition rate FAST PDV measurement without the measurements overlapping in time

The multiplexing systems in FIG. 5 will have the same general behavior but are segmented with different velocity ranges determined by the filtering of the WPM 110 happening in different time slots determined by the delays 112 for the upper implementation in FIG. 5 or on different digitizers 98 for the lower implementation in which multiplexing geometry is used and the particulars of how its implemented. Measurements are recorded sequentially in time at the rate of the mode-locked laser within each of the velocity or spectral ranges.

Figure 6:
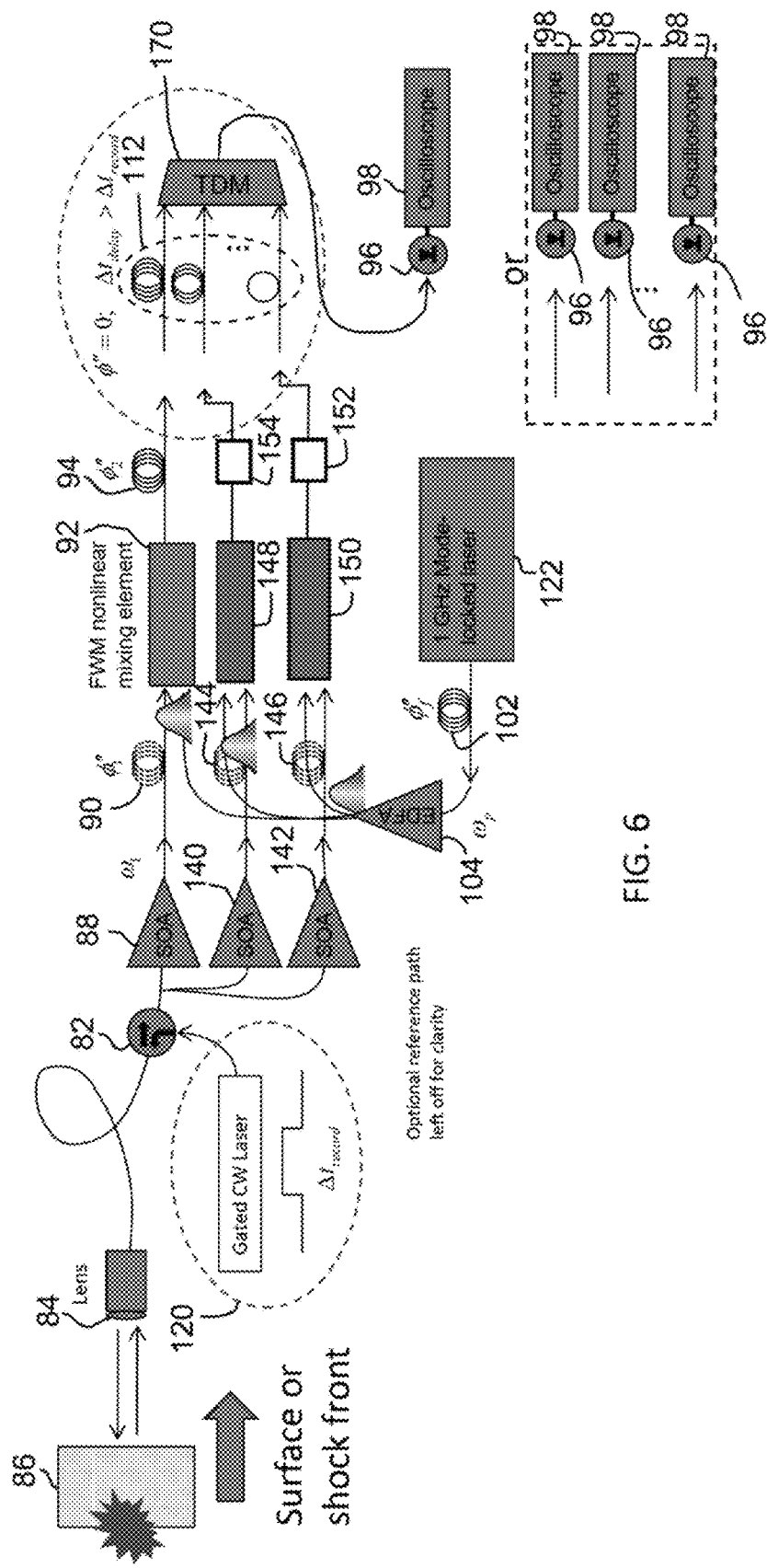
FIG. 6 shows an embodiment that employs time multiplexing to allow higher rate sampling FAST PDV.

FIG. 6 shows a time domain multiplexed version. It will have the same general behavior as described above but with every $N_{th}$ measurement in time recorded on a different oscilloscope 98 for N nonlinear mixing elements 92, 148, 150 (the figure shows 3 of N total) in the implementation at the bottom of the figure. In the sipper implementation every $N_{th}$ measurement with the record $\Delta t_{record}$ is recorded in packets on the same oscilloscope 98 delayed by a much larger delay $\Delta t_{delay}$.

For ideal Fourier transformation of the input signal reflecting off the moving surface, the input, focal, and output dispersions must be equal. In this application, deviations from the ideal case may be possible and even advantageous. If we assume the Doppler shifted light is nearly constant frequency over the duration of a chirped pump pulse, the specific input dispersion will become irrelevant, simplifying system deployment because that element would not require precise control. The output is ultimately detected by a photodiode and oscilloscope. Their bandwidth limit will likely blur the system response duration. Output dispersion larger in magnitude than the focal dispersion would also blur the ideal optical system response but if the optical blur is less than the electrical blur it would be inconsequential. Increasing the output dispersion also increases the temporal shift for a given frequency shift, not just the pulse width duration. Thus, a non-ideally focused system may have better peak Doppler frequency shift (mean velocity change) resolution with only minor change in frequency or velocity width or uncertainty.

Polarization controllers adjust the optical signals polarization state of the beams output gain unit 48 and from chirped pulse laser 60 and CW pump laser 66 and are generally required since optical frequency mixing (such as FWM, SFG, and DFG) is polarization sensitive, yet many components such as standard optical fibers do not maintain polarization. Polarization controllers can be manual or automatic and can be placed in many different locations in the system to control the polarization at the mixing elements.

FIGS. 4-6 are other particular instances of FIG. 3 with details on subsystems. FIG. 4 is a basic system without multiplexing to increase the repetition rate. The chirped pump source of FIG. 3 is broken out and shown in detail as a mode-locked laser, followed by dispersion to produce a chirped pulse with adjustable chirp rate (equivalent to adjusting focal dispersion), and erbium-doped fiber amplifier (EDFA) to increase the pump pulse peak power to a level required to pump the nonlinear mixing element. Although not shown in FIGS. 4 and 5, but generally required are a means for controlling the polarization of the output beam from SOA 88 and EDFA 104. Similarly, although not shown in FIG. 6, but generally required is a means for controlling the polarization of the output beam from SOAs 88, 140, 142 and EDFA 104.

This system of FIG. 4 is operated at a modest 1 GHz repetition rate, having 1 ns from frame to frame in FIG. 2C. The fast dynamic gain element is shown as a semiconductor optical amplifier (SOA) (and constant output power control circuitry not shown). Either a single laser can be used to probe the target only, the same laser can be split to provide a non-Doppler shifted reference, and/or another independent laser can be used to provide a non-Doppler shifted reference signal.

The beam from CW laser(s) 80 of FIG. 4 is directed by fiber circulator 82 through lens 84 onto the surface of object 86. When the surface of object 86 moves, the frequency of the light that passes back through lens 84 is Doppler shifted. The light then passes through fiber circulator 82 follows a path through semiconductor optical amplifier (SOA) 88, input dispersion element 90, four wave mixing (FWM) nonlinear mixing element 92, output dispersion element 94 and onto detector 96 which is connected to oscilloscope 98. In this embodiment, a 1 GHz modelocked laser 100 provides a beam which follows a path through dispersion element 102, erbium doped fiber amplifier 104, mixing element 92, output dispersion element 94 and onto detector 96 which is connected to oscilloscope 98. Note that an optional standard PDV system can be implemented by splitting the Doppler shifted signed after SOA 88 and onto a detector 106 which is connected to oscilloscope 108.

In FIGS. 5 and 6, we present approaches for operating a higher measurement rates without requiring faster recording electronics, or many more channels of recording electronics. Both require that the input "CW Laser" be gated to the duration to be recorded.

In FIG. 5 a higher repetition rate 20 GHz mode-locked laser is used. If the same dispersions were used in the Fourier transform processing as in FIG. 4, the resulted output waveforms would overlap and be indistinguishable at the recording photodiode and scope. By adding a wavelength domain multiplexing (WDM) filter to separate wavelength bands which when dispersed are shorter in duration than the period of the mode-locked laser, overlapping is avoided. The signals are segmented and split into multiple WDM channels which could be recorded with multiple oscilloscopes (digitizers). Since digitizers are expensive we add zero dispersion delay lines with delay increments greater than the record length to each WDM channel and recombine them to one fiber output. A possible problem with this approach in FIG. 5 is that the multiple overlapping chirped pump pulse may mix with each other in the FWM element and cause distortion.

With some exceptions, the elements in the embodiment of FIG. 5 are identical to those of FIG. 4 and therefore the same reference numbers are used. In this embodiment, a gated CW laser 120 provides a beam into fiber circulator 82. Further, as discussed above, a 20 GHz modelocked laser 122 provides a beam that enters the system, after is passes through dispersion element 102 and EDFA 104. In addition, the beam that passes through four wave mixing (FWM) nonlinear mixing element 92 and output dispersion element 94 is separated into multiple beams by wavelength division de-multiplexer 110. Each beam is shown to travel through its own time delay 112 before being recombined by multiplexer 114. The combined output beam from the multiplexer 114 is directed onto photo receiver 96 and displayed by oscilloscope (or digitizer) 98. Alternately, as shown in the insert to the figure, each output from de-multiplexer 110 can be directed to its own individual photo receiver 96 and oscilloscope 98.

The system in FIG. 6 splits the reflected Doppler shifted return signal into multiple replicas that are each processed with separate time lenses. The pump laser operates at a lower repetition rate with shorter duration time lens pulses shifted relative to each other on each channel. The parallel optical outputs could again be recorded with a parallel array of digitizers (oscilloscopes) but are again shown here recombined with appropriate time shifts and recorded on a single oscilloscope to save money on electronics.

With some exceptions, many of the elements in the embodiment of FIG. 6 are identical to those of FIG. 5 and therefore the same reference numbers are used. In this embodiment, the output beam from fiber circulator 82 is divided into 3 beams, each of which travels through its SOA (88, 140, 142) and its own input dispersion element (90, 144, 146) respectively, FWM nonlinear mixing element (92, 148, 150) respectively and output dispersion element (94, 152, 154) respectively. In this embodiment as in FIG. 4, a 1 GHz modelocked laser 122, provides the inputs beam to dispersion device 102. In one implementation, the individual outputs from output dispersion elements 94, 152 and 154 pass through their own delay line 160, 162, 164 and are combined by a time domain de-multiplexer 170 into a single output which is then sent to photo receiver 96 and oscilloscope 98. Alternately, as shown in the insert to the figure, the individual outputs from output dispersion elements 94, 152 and 154 can each be directed to their own photo receiver 96 and oscilloscope 98.

Note again that the system in FIG. 4 can run simultaneously with a standard PDV system (as shown). In that case the heterodyning or homodyning reference laser is required for conventional PDV and produces a fixed pulse train as shown by the dotted lines in FIG. 2C for the FAST velocimetry output. FIGS. 5 and 6 would also work concurrently with conventional PDV, with the simple addition of long pulse modulation to gate the CW incident light to the PDV probe. That gate would have no effect in the conventional PDV system but enables the multiplexing of the FAST velocimetry outputs in FIG. 5 and 6.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A method, comprising:
   directing a first frequency of light onto a surface at a first time to produce a first reflected signal, wherein said surface is not moving relative to a reference point during said first time;
   performing a Fourier transform of said first reflected signal to produce a first pulse in time;
   directing said first frequency of light onto said surface at a second time to produce a second reflected signal, wherein said surface is moving relative to said reference point during said second time, wherein said first frequency of light is Doppler shifted to a second frequency of light according to the velocity of said surface;
   performing a Fourier transform of said second reflected signal to produce a second pulse in time;
   measuring the time difference between said first puke in time and said second pulse in time; and
   determining the velocity of said surface from said time difference.

2. The method of claim 1, wherein said first frequency of light is provided by a continuous wave (CW) laser.

3. The method of claim 2, further comprising gating said CW laser.

4. The method of claim 3, wherein said second pulse in time comprises a plurality of identical second pulses in time.

5. The method of claim 4, further comprising imparting a unique delay on each said pulse of said plurality of identical second pulses in time such that said second pulse comprises delayed pulses, wherein the step of imparting a unique delay is carried out prior to the step of measuring the time difference between said first pulse in time and said second pulse in time.

6. The method of claim 5, further comprising combining said delayed pulses in time such that said second pulse comprises combined pulses.

7. The method of claim 6, wherein the step of measuring the time difference between said first pulse in time and said second pulse in time comprises measuring the time difference between said first pulse in time and each pulse of said combined pulses.

8. The method of claim 4, wherein the step of measuring the time difference between said first pulse in time and said second pulse in time comprises measuring the time difference between said first pulse in time and each pulse of said of said plurality of second pulses.

9. The method of claim 3, wherein said second reflected signal comprises a plurality of identical second reflected signals.

10. The method of claim 9, wherein the step of performing a Fourier transform of said second reflected signal is carried out with a separate time lens operating on each said second reflected signal of said plurality of identical second reflected signals, wherein said second pulse in time comprises said plurality of identical second pulses in time.

11. The method of claim 10, further comprising imparting a unique delay on each pulse of said plurality of identical second pulses in time to produce delayed pulses such that said second pulse in time comprises said delayed pulses.

12. The method of claim 11, further comprising combining said delayed pulses of said second pulse such that said second pulse comprises combined pulses.

13. The method of claim 12, wherein the step of measuring the time difference between said first pulse in time and said second pulse in time comprises measuring the time difference between said first pulse in time and each of said combined pulses.

14. The method of claim 10, wherein the step of measuring the time difference between said first pulse in time and said second pulse in time comprises measuring the time difference between said first pulse in time and each pulse of said of said plurality of second pulses in time.

15. The method of claim 1, further comprising adjusting the power level of said second reflected signal.

16. The method of claim 1, further comprising using a fast dynamic gain unit to adjust the amplitude of said second reflected signal.

17. The method of claim 1, further comprising using a semiconductor optical amplifier to stabilize the amplitude of said second reflected signal.

18. The method of claim 1, further comprising using an automatic polarization control method to stabilize the amplitude of said second reflected signal.

19. The method of claim 18, wherein said automatic polarization control method utilizes at least one of a constant output power controller and a nonlinear optical power limiter.

20. The method of claim 1, wherein the step of performing a Fourier transform of said first reflected signal to produce a first pulse in time and the step of performing a Fourier transform of said second reflected signal to produce a second pulse in time is carried out with a time lens.

21. The method of claim 20, wherein the input dispersion, focal dispersion and output dispersion of said time lens are about equal.

22. The method of claim 20, wherein said time lens utilizes sum and difference-frequency mixing.

23. The method of claim 20, further comprising chirp inverting said first pulse in time and said second pulse in time prior to the step of measuring the time difference between said first pulse in time and said second pulse in time.

24. An apparatus, comprising:
a source for providing a first frequency of light;
means for (i) directing said first frequency of light onto a surface at a first time to produce a first reflected signal when said surface is not moving relative to a reference point during said first time and (ii) directing said first frequency of light onto said surface at a second time to produce a second reflected signal when said surface is moving relative to said reference point during said second time, wherein said first frequency of light is Doppler shifted to a second frequency of light according to the velocity of said surface;
means for (i) performing a Fourier transform of said first reflected signal to produce a first pulse in time and (ii) performing a Fourier transform of said second reflected signal to produce a second pulse in time;
means for measuring the time difference between said first pulse in time and said second pulse in time; and
means for determining the velocity of said surface from said time difference.

25. An apparatus, comprising:
means for directing a first frequency of light onto a surface at a first time to produce a first reflected signal when said surface is not moving relative to a reference point during said first time;
means for performing a Fourier transform of said first reflected signal to produce a first pulse in time;
means for directing said first frequency of light onto said surface at a second time to produce a second reflected signal when said surface is moving relative to said reference point during said second time, wherein said first frequency of light is Doppler shifted to a second frequency of light according to the velocity of said surface;
means for performing a Fourier transform of said second reflected signal to produce a second pulse in time;
means for measuring the time difference between said first pulse in time and said second puke in time; and
means for determining the velocity of said surface from said time difference.

26. The apparatus of claim 25, wherein said first frequency of light is provided by a continuous wave (CW) laser.

27. The apparatus of claim 26, wherein said CW laser is gated.

28. The apparatus of claim 27 further comprising means for separating said second pulse in time into a plurality of identical second pulses in time.

29. The apparatus of claim 28, further comprising a plurality of delay lines configured for imparting a unique delay on each said pulse of said plurality of identical second pulses in time such that said second pulse comprises delayed pulses.

30. The apparatus of claim 29, further comprising means for combining said delayed pulses in time such that said second pulse comprises combined pulses.

31. The apparatus of claim 27, further comprising means for configuring said second reflected signal to comprise a plurality of identical second reflected signals.

32. The apparatus of claim 31, wherein said means for performing a Fourier transform of said second reflected signal is carried out with a separate time lens operating on each said second reflected signal of said plurality of identical second reflected signals, wherein said second pulse in time comprises said plurality of identical second pulses in time.

33. The apparatus of claim 32, further comprising means for imparting a unique delay on each pulse of said plurality of identical second pulses in time to produce delayed pulses such that said second pulse in time comprises said delayed pulses.

34. The apparatus of claim 33, further comprising means for combining said delayed pulses of said second pulse such that said second pulse comprises combined pulses.

35. The apparatus of claim 26, further comprising a fast dynamic gain unit configured to adjust the amplitude of said second reflected signal.

36. The apparatus of claim 25, further comprising means for adjusting the power level of said second reflected signal.

37. The apparatus of claim 25, further comprising a semiconductor optical amplifier configured to stabilize the amplitude of said second reflected signal.

38. The apparatus of claim 25, further comprising an automatic polarization control means configured to stabilize the amplitude of said second reflected signal.

39. The apparatus of claim 38, wherein said automatic polarization control method comprises at least one of a constant output power controller and a nonlinear optical power limiter.

40. The apparatus of claim 25, wherein said means for performing a Fourier transform of said first reflected signal to produce a first pulse in time and said means for performing a Fourier transform of said second reflected signal to produce a second pulse in time is carried out with a time lens.

41. The apparatus of claim 40, wherein the input dispersion, focal dispersion and output dispersion of said time lens are about equal.

42. The apparatus of claim 40, wherein said time lens utilizes sum and difference-frequency mixing.

43. The apparatus of claim 40, further comprising means for chirp inverting said first pulse in time and said second pulse in time.

* * * * *